United States Patent
Kabe

(10) Patent No.: US 6,765,728 B2
(45) Date of Patent: Jul. 20, 2004

(54) LENS APPARATUS

(75) Inventor: Eiichi Kabe, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/388,544

(22) Filed: Mar. 17, 2003

(65) Prior Publication Data

US 2003/0184877 A1 Oct. 2, 2003

(30) Foreign Application Priority Data

Mar. 29, 2002 (JP) ........................................ 2002-095445

(51) Int. Cl.⁷ ............................................. G02B 15/14
(52) U.S. Cl. ..................................... 359/699; 359/701
(58) Field of Search ................................. 359/694, 699, 359/700, 701, 823

(56) References Cited

U.S. PATENT DOCUMENTS

| | | | |
|---|---|---|---|
| 4,993,815 A | * | 2/1991 | Yamazaki et al. .......... 359/699 |
| 5,218,479 A | * | 6/1993 | Chiou et al. ................ 359/700 |
| 5,687,029 A | * | 11/1997 | Omi et al. .................. 359/700 |
| 6,049,432 A | * | 4/2000 | Machida et al. ............ 359/700 |
| 6,335,834 B1 | * | 1/2002 | Nomura et al. ............. 359/700 |

FOREIGN PATENT DOCUMENTS

JP          2001-242368          9/2001

* cited by examiner

*Primary Examiner*—Ricky Mack
(74) *Attorney, Agent, or Firm*—Arnold International; Jon W. Henry; Bruce Y. Arnold

(57) ABSTRACT

A lens apparatus includes four lens groups and a plurality of barrels with grooves that guide and drive the lens frames of the four lens groups in order to achieve a high zoom ratio and retraction of the lens apparatus into a camera body when the lens apparatus is not in use. Two sets of three guide grooves in a fixed barrel and three cam grooves in a cam barrel are unequally spaced around the circumference of the barrels so as to provide more room for an additional groove in the cam barrel. Some of the lens frames are fully supported by pins in the grooves and some of the lens frames are partially supported by guide rods in the lens apparatus. A single guide rod helps support two lens frames in order to save space in the lens apparatus.

18 Claims, 8 Drawing Sheets

LENS APPARATUS

BACKGROUND OF THE INVENTION

Recent electronic still cameras include a lens barrel that can be housed in a camera body when not in use in order to satisfy the requirement for compactness when the camera is not in use. The lens barrel and lens groups forming the lens system of the camera are supported in the camera to be movable along the optical axis. The lens barrel and the lens groups are extended to various positions toward an object being imaged when the camera is being used for imaging, and the lens barrel and lens groups are retracted to or toward positions inside the camera body when the camera is not in use.

For example, Japanese Laid-Open Patent Application No. 2001-242368 discloses a lens apparatus with a lens barrel and lens groups that are movable along the optical axis. First and second lens groups, in order from the object side, are movably supported in three-way suspensions by pins. Third and fourth lens groups, in order from the object side, are movably supported by guide bars. The lens apparatus may be retracted to a position where its retracted length is only 60 percent of its maximum extended length.

The lens apparatuses of recent electronic still cameras are also required to provide a bright image along with high zoom ratios. This, in turn, requires an increased number of lenses and lens groups. Additionally, an increasing number of lens apparatuses have been designed to house drive mechanisms such as motors in the lens barrel for further compactness. Especially recently, much higher zoom ratios have been demanded. However, the prior art structures hamper achieving a high zoom ratio with compactness.

For example, the lens apparatus described in Japanese Laid-Open Patent Application No. 2001-242368, discussed above, includes three lens frames that are movable by cam pins on their outer periphery that are engaged with forwarding grooves on a fixed barrel and with cam grooves on a cam barrel provided on the outer periphery of the fixed barrel. More specifically, three forwarding grooves for each of the fixed lens group and the zoom lens group are provided on the fixed barrel at regular intervals circumferentially around the periphery of the fixed barrel, and three cam grooves for each of the fixed lens group and the zoom lens group are provided on the cam barrel at regular intervals circumferentially around the cam barrel. Additionally, a forwarding groove for a relay lens group is provided on the fixed barrel, and a cam groove for the relay lens group is provided on the cam barrel.

With the above described structure, in order to obtain a zoom ratio of eight, the cam grooves are highly inclined so as to increase the movements of the lens groups. Thus, the cam grooves must be made more nearly parallel to the optical axis or the cam barrel must have a larger circumference in order to increase the movements of the lens groups. However, if the cam grooves are made more nearly parallel to the optical axis, the cam grooves receive an increased force in the normal direction and, therefore, the frictional drag between the cam groove and the cam pins increases, which can lead to malfunctioning of the lens apparatus. On the other hand, making the circumference of the cam barrel larger is counter to the requirement for compactness.

BRIEF SUMMARY OF THE INVENTION

The present invention relates to a compact lens apparatus that provides a high zoom ratio that can be used in an electronic still camera.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

A preferred embodiment of a lens apparatus of the present invention will now be described with reference to the attached drawings. In the following description, elements that are essentially identical, except for their location, are denoted by the same reference symbol that will be recited only once when the essentially identical elements are being referenced.

Figure 1:
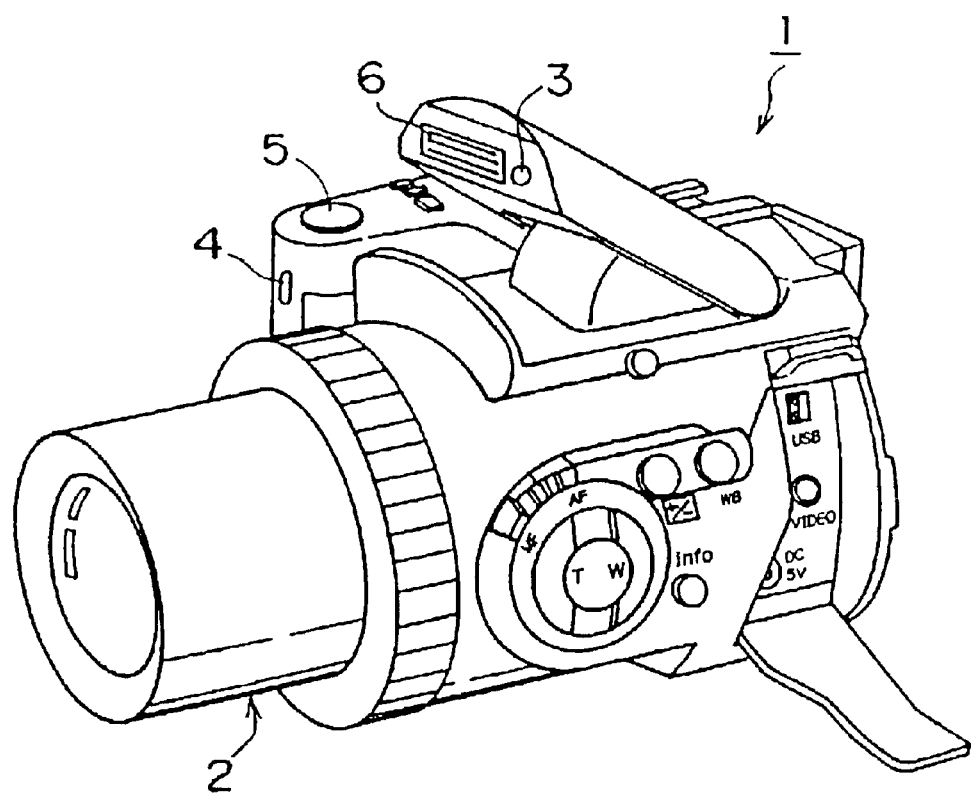
FIG. 1 shows a perspective view of the exterior of an electronic still camera that includes a lens apparatus according to a preferred embodiment of the present invention.

FIG. 1 shows a perspective view of the exterior of an electronic still camera 1 that includes a lens apparatus 2 according to the present invention. As shown in FIG. 1, the electronic still camera 1 has generally a rectangular box-shaped body that is provided with a lens apparatus 2, a strobe light adjusting sensor 3, and a self-timer 4 on a front surface of the camera. The top of the camera includes a shutter button 5 and a pop-up strobe 6. The back of the camera, which is not shown in the drawings, may include a finder ocular, a liquid crystal display panel, and controls for operation of the camera.

The electronic still camera 1 is of the retractable type. The lens apparatus 2 is extended for use, and the lens apparatus is retracted when not in use so that the front of the lens apparatus 2 is nearly flat when the camera is not in use.

Figure 2:
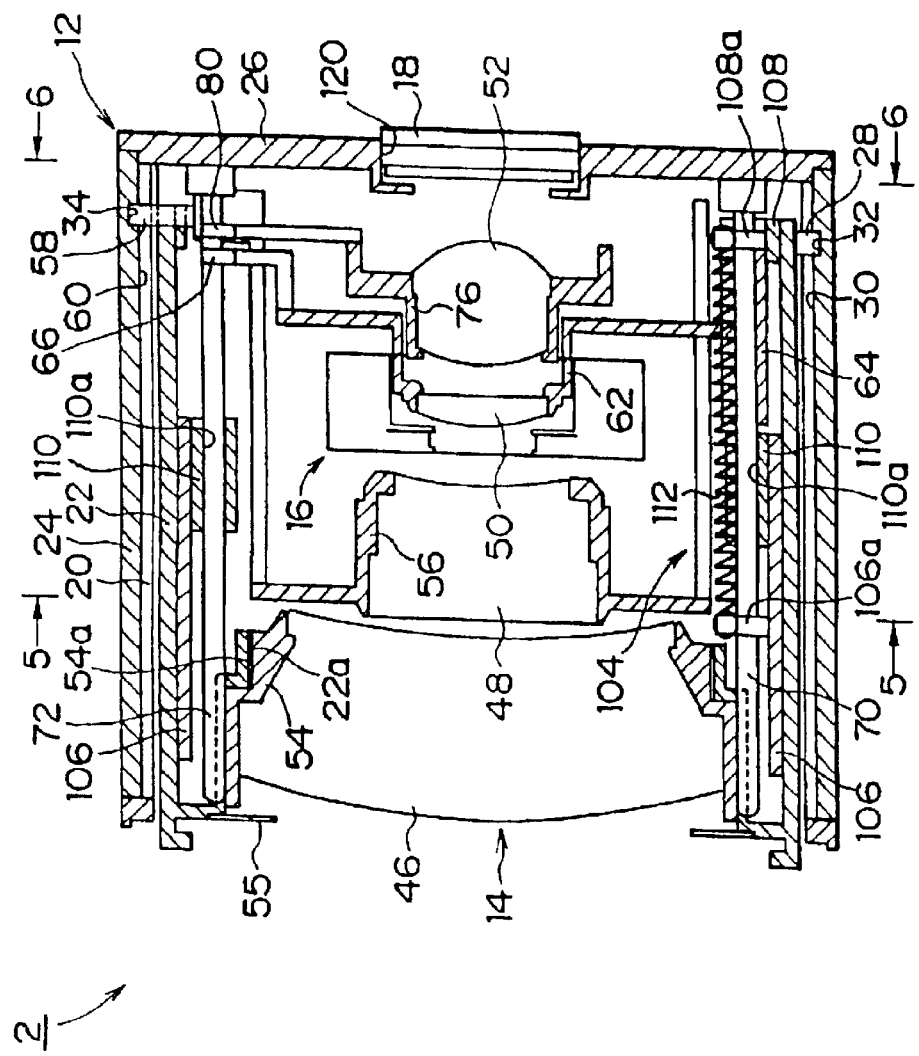
FIG. 2 shows the lens apparatus of FIG. 1 in the retracted state.
Figure 3:
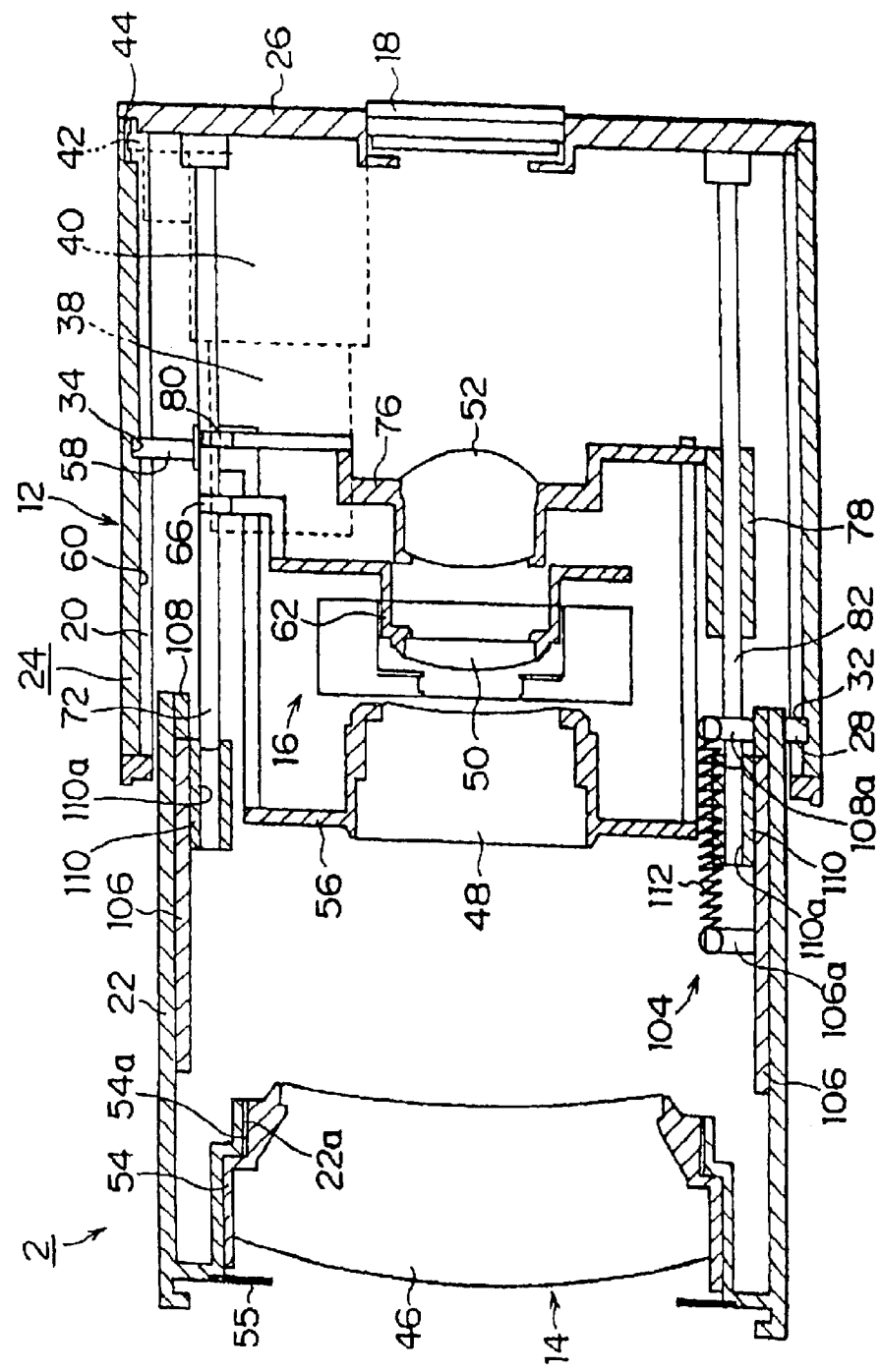
FIG. 3 shows the lens apparatus of FIG. 1 in the extended state at a wide-angle setting.
Figure 4:
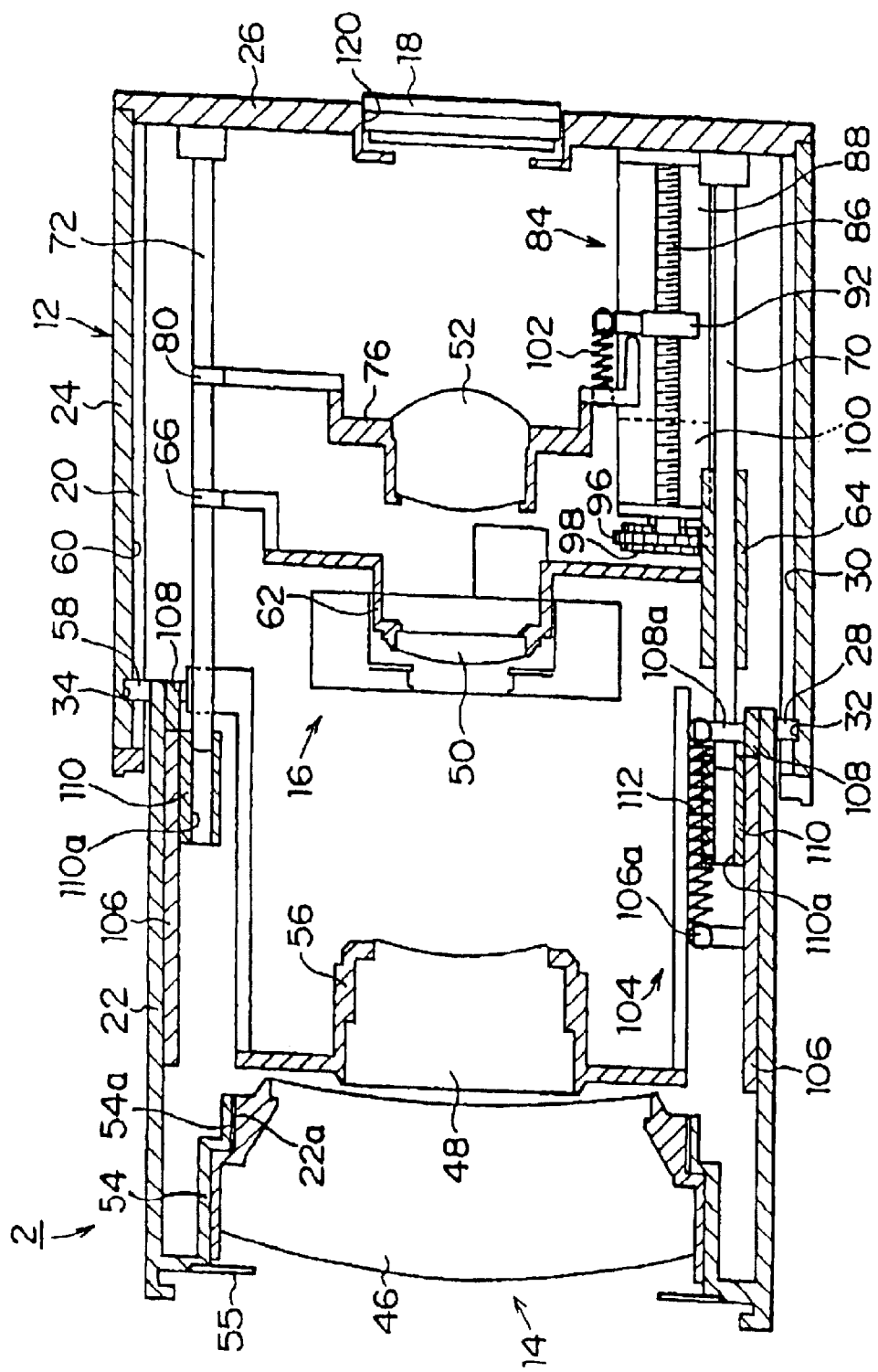
FIG. 4 shows the lens apparatus of FIG. 1 in the extended state at a telephoto setting.
Figure 5:
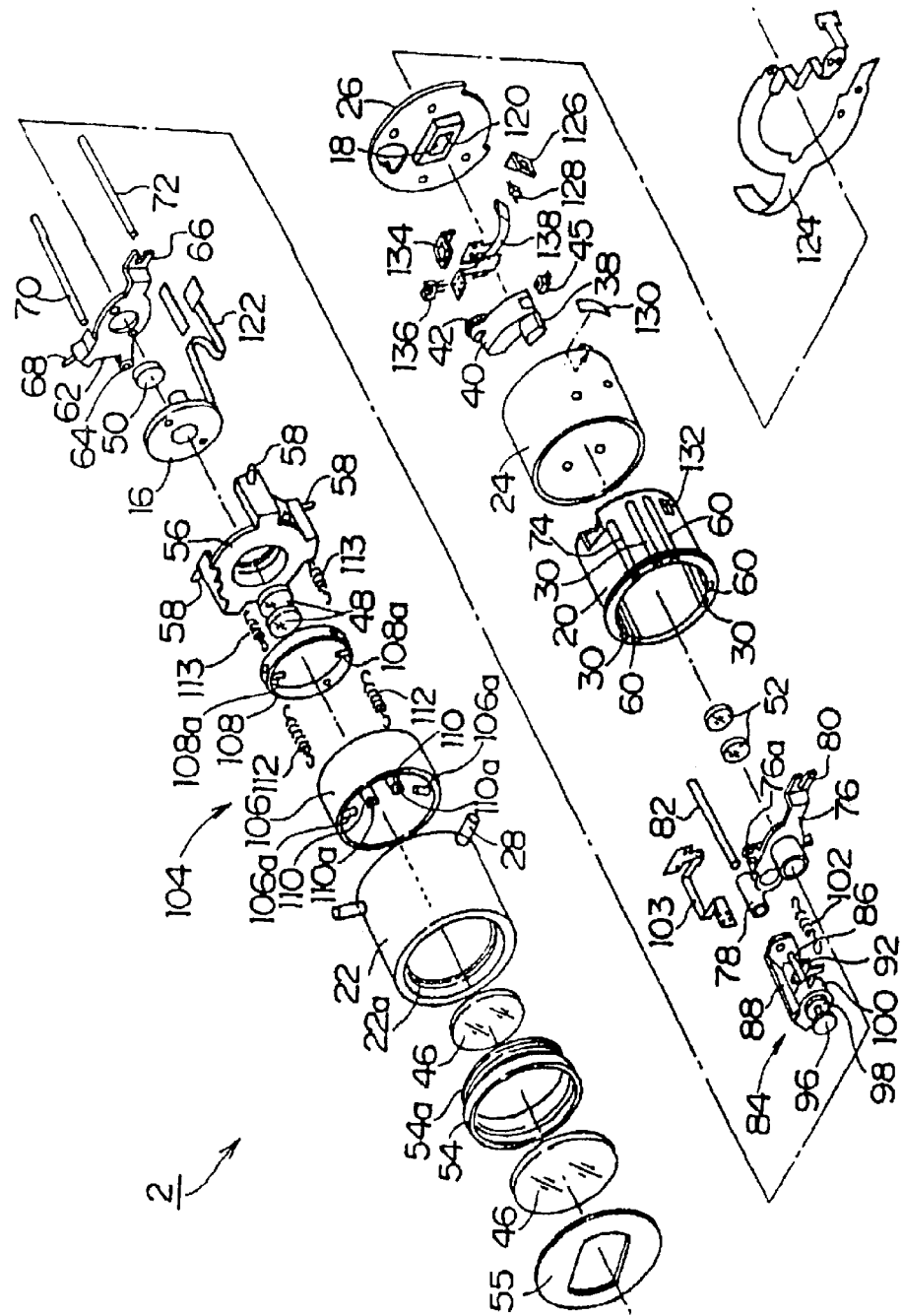
FIG. 5 shows an exploded perspective view of the lens apparatus of FIG. 1.

FIGS. 2 to 4 show cross-sectional views of the lens apparatus 2 of FIG. 1. FIG. 2 shows the lens apparatus 2 in the retracted state, and FIGS. 3 and 4 show the lens apparatus 2 in the extended state at different lens settings. FIG. 5 shows an exploded perspective view of the lens apparatus of FIG. 1. As shown in FIGS. 2 to 5, the lens apparatus 2 includes a lens barrel 12, a camera lens 14, a diaphragm shutter unit 16, and a CCD unit 18.

First, the structure of the lens barrel 12 will be described. The lens barrel 12 includes a fixed barrel 20, a movable barrel 22 that is movable in the fixed barrel 20, and a cam barrel 24 that is rotatable on the outer periphery of the fixed barrel 20. The fixed barrel 20 has a cylindrical body with a flat base 26 at the image end. The lens apparatus 2 is mounted on the camera body with the base 26 fixed to the camera body, a connection that is not shown in the drawings.

The movable barrel 22 has a cylindrical shape and is movable back and forth in the fixed barrel 20. The movable barrel 22 includes three first cam pins 28 unequally spaced in the circumferential direction on the outer periphery of the movable barrel 22 near its base end. Each first cam pin 28 is engaged with a different one of three first forwarding grooves 30 formed on the fixed barrel 20. The first forwarding grooves 30 are parallel to the longitudinal axis of the fixed barrel 20 that defines an optical axis so that the movable barrel 22 can move back and forth along the optical axis with respect to the fixed barrel 20.

The cam barrel 24 has a cylindrical body and is rotatable on the outer periphery of the fixed barrel 20. The cam barrel 24 has three first cam grooves 32, three second cam grooves 34, and a third cam groove 36 (FIG. 7) on its inner periphery. The cam grooves are arranged so that they do not overlap each other.

The first cam grooves 32 and the second cam grooves 34 are unequally spaced in the circumferential direction on the inner periphery of the cam barrel 24 so as to use the surface of the cam barrel 24 most efficiently. The third cam groove 36 is provided on the cam barrel 24 between the first cam groove 32 and the second cam groove 34 that are separated the greatest distance in the circumferential direction on the cam barrel 24.

Figure 8:
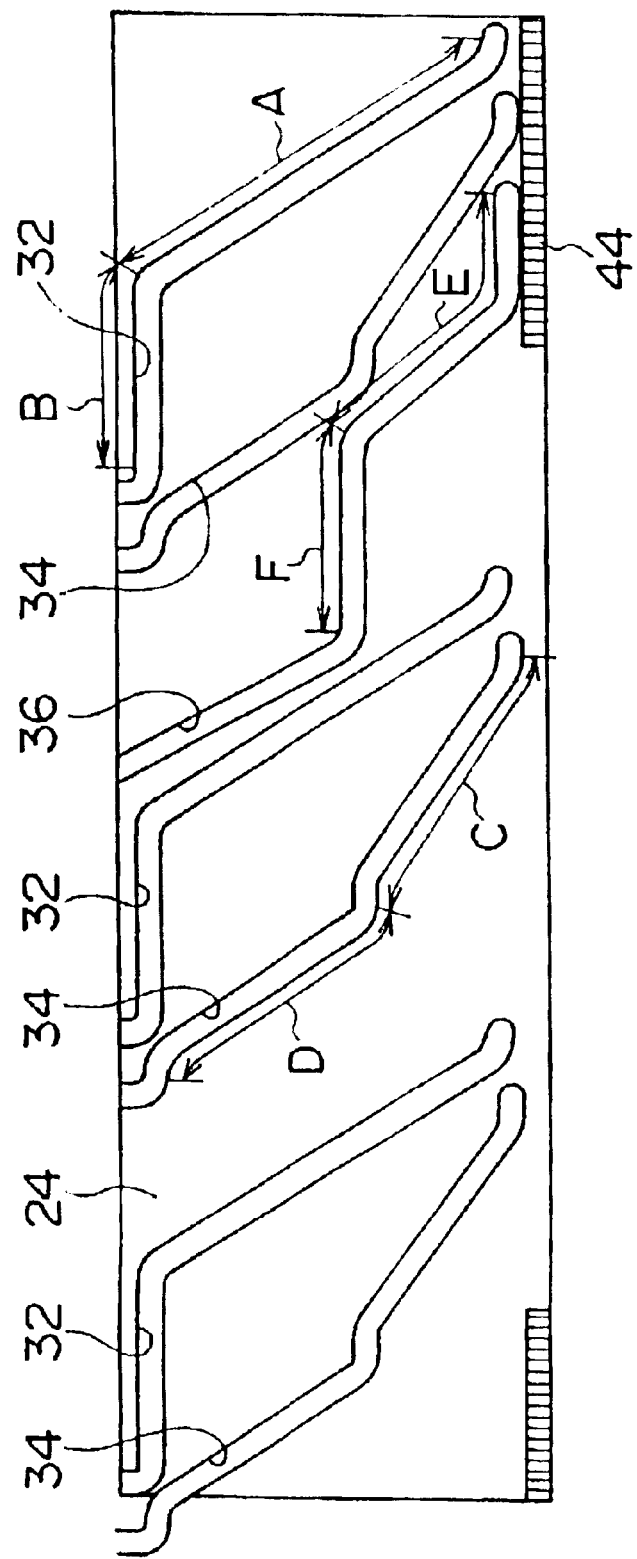
FIG. 8 is a diagram of an interior view of the cam barrel, including cams, of the lens apparatus of FIG. 1.

The three first cam pins 28 on the outer periphery of the movable barrel 22 fit through the three forwarding grooves 30 on the fixed barrel 20 into three first cam grooves 32 on the cam barrel 24. The first cam grooves 32 and the first forwarding grooves 30 serve to move the movable barrel 22 back and forth along the optical axis when the cam barrel 24 rotates. The first cam groove 32 includes a section A and a section B as shown in FIG. 8. Section A guides the movable barrel 22 from the retracted position to the extended position, and Section B retains the movable barrel 22 at the extended position.

Figure 7:
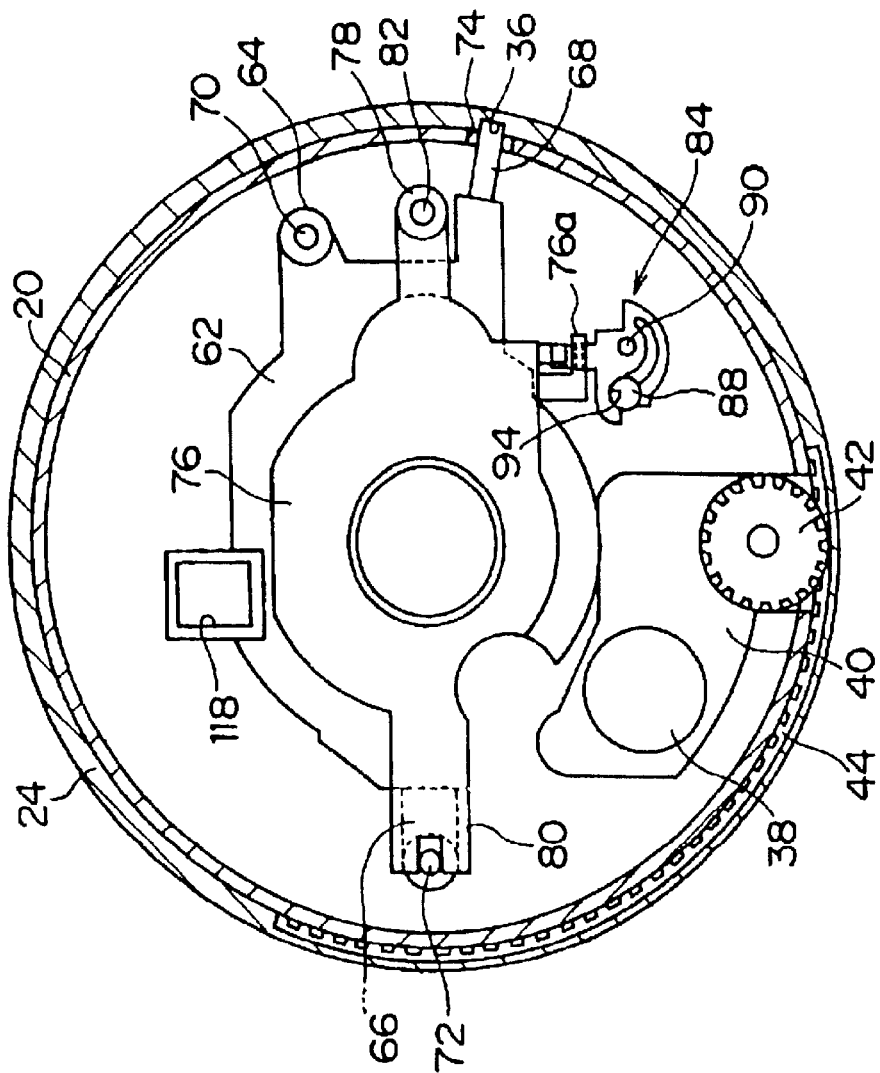
FIG. 7 shows a cross-sectional view of the lens apparatus of FIG. 1 taken along the 6—6 line of FIG. 2.

The cam barrel 24 is driven by a cam barrel driving motor 38 housed in the fixed barrel 20 with a drive mechanism configured as follows. As shown in FIGS. 3, 5, and 7, where FIG. 7 shows a cross-sectional view of the lens apparatus of FIG. 1 taken along line 6—6 of FIG. 2, the cam barrel driving motor 38 is fixed to the inner surface of the base 26 via a gear box 40. The gear box 40 serves to reduce the rotation rate of the cam barrel driving motor 38 at a certain gear ratio, and its output shaft is fixed to a driving gear 42. Additionally, an internal gear 44 is provided on the inner periphery of the cam barrel 24 at its base end. The driving gear 42 is engaged with the internal gear 44. With the driving mechanism described above, the cam barrel driving motor 38 is driven to rotate the driving gear 42 that transmits the rotation to the internal gear 44 so as to rotate the cam barrel 24.

A photo-interrupter 45 (see FIG. 5) for detecting the amount of rotation of the cam barrel 24 is provided on the cam barrel driving motor 38. The photo-interrupter 45 outputs pulse signals to a control unit in the camera body according to the amount of rotation of the output shaft of the cam barrel driving motor 38 when the cam barrel driving motor 38 is driven. The control unit in the camera body counts the output pulses from the photo-interrupter 45 to calculate the amount of rotation of the cam barrel 24.

Next, the structure of the camera lens 14 will be described. The camera lens 14 is a four-group zoom lens that includes a fixed lens group 46, a zoom lens group 48, a relay lens group 50, and a focusing lens group 52. The fixed lens group 46 is held by a first lens frame 54. A male screw member 54a is provided on the outer periphery of the lens frame 54 at its base end. A female thread (i.e., screw member) 22a is provided on the inner periphery of the movable barrel 22 at its front or object end, opposite the base end. The male screw member 54a is screwed into the female thread 22a in order to fix the first lens frame 54 to the movable barrel 22 at its front or object end. With the first lens frame 54 fixed to the movable barrel 22 in this way, the fixed lens group 46 moves together with the movable barrel 22 as one piece. A decorative ring 55 is provided at the object end of the movable barrel 22 where the fixed lens group is mounted.

Figure 6:
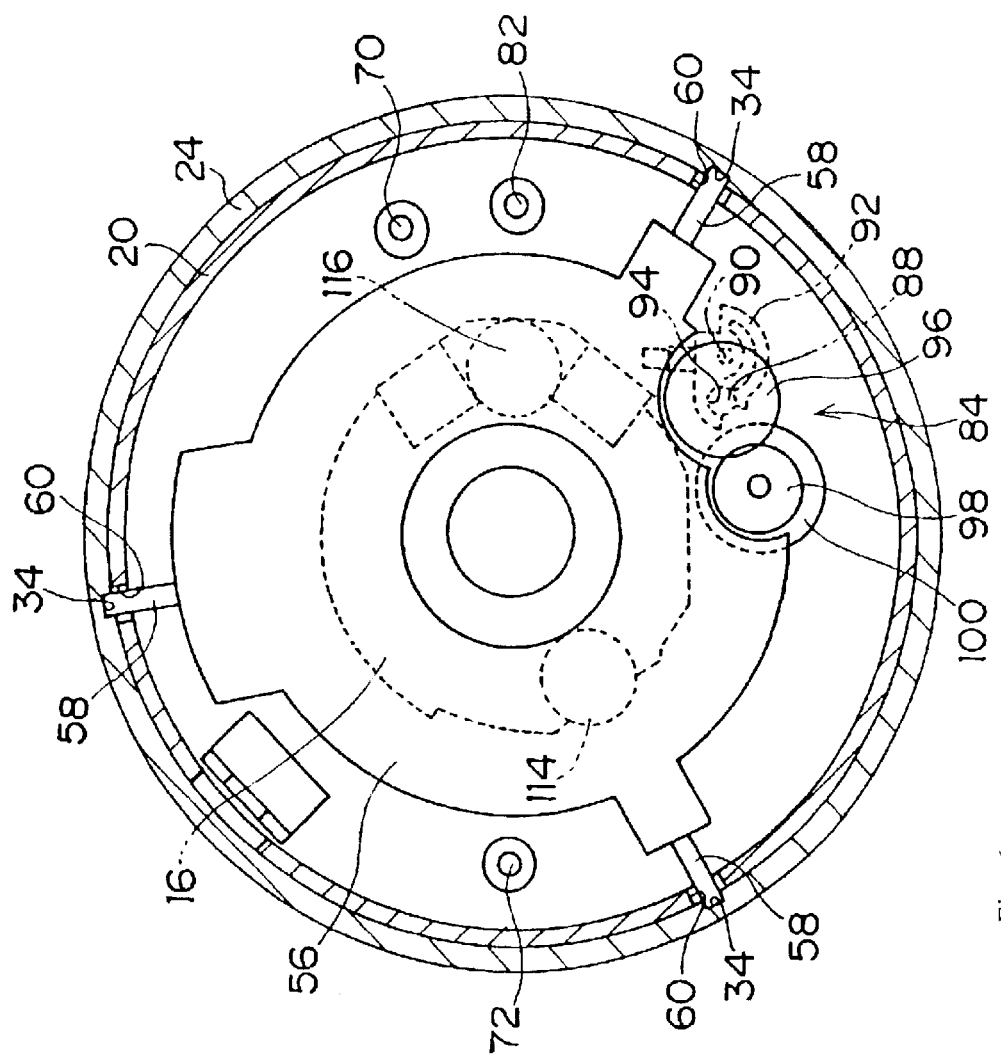
FIG. 6 shows a cross-sectional view of the lens apparatus of FIG. 1 taken along the 5—5 line of FIG. 2.

The fixed lens group 46 is followed, on its image side, by the zoom lens group 48, which is held by a second lens frame 56. FIG. 6 shows a cross-sectional view of the lens apparatus of FIG. 1 taken along the 5—5 line of FIG. 2. The second lens frame 56 has three second cam pins 58 unequally spaced on the outer periphery at its base end as shown in FIG. 6. That is, the second cam pins 58 are spaced at irregular intervals in the circumferential direction of the lens barrels. As shown in FIG. 6, the circumferential distances of the right second cam pin 58 from the other two second cam pins 58 is about equal, but the circumferential distance of the left second cam pin 58 from the top second cam pin 58 is substantially less than those distances. The second cam pins 58 fit in three second forwarding grooves 60 formed on the fixed barrel 20. The second forwarding grooves 60 are formed in the longitudinal direction (i.e., parallel to the optical axis) of the fixed barrel 20 so that the second cam pins 58 support the second lens frame 56 to be movable along the optical axis within the fixed barrel 20. The second cam pins 58 also fit in three second cam grooves 34 on the cam barrel 24. The three second cam grooves 34 and the three second forwarding grooves 60 serve to move the second lens frame 56 back and forth along the optical axis when the cam barrel 24 rotates.

FIG. 8 is a diagram of an interior view of the cam barrel 24, including cams, of the lens apparatus of FIG. 1. As shown in FIG. 8, the three second cam grooves 34 guide the second lens frame 56 from the retracted position to the wide-angle end in the section C of the three second cam grooves 34 and from the wide-angle end to the telephoto end in the section D.

The zoom lens group 48 is followed by the relay lens 50, which is held by a third lens frame 62. The third lens frame 62 is integrally provided with two guide members or guide blocks 64, 66 and a third cam pin 68 as shown in FIG. 7. The two guide blocks 64, 66 have cylindrical and U-letter shapes, respectively. The cylindrical guide block 64 is fitted on a first guide bar 70 provided in the fixed barrel 20. The U-letter shaped guide block 66 is fitted on a second guide bar 72 provided in the fixed barrel 20.

The first and second guide bars 70 and 72 are arranged to be parallel to the longitudinal axis of the fixed barrel 20, as shown in FIGS. 2 to 4. The base ends of the first and second guide bars are fixed to the inner surface of the base 26 and the front ends of the first and second guide bars are supported by a front supporting mechanism 104 that is provided in the movable barrel 22 (the detailed structure of the front supporting mechanism 104 will be described later). The guide blocks 64, 66 are slidably fixed to the first and second guide bars 70 and 72, respectively. Thus, the third lens frame 62 is supported so that it is movable along the optical axis within the fixed barrel 20.

A single cam pin 68 is fitted in a third forwarding groove 74 on the fixed barrel 20 and in the third cam groove 36 on the cam barrel 24. The third forwarding groove 74 is parallel to the longitudinal axis of the fixed barrel 20. The third cam groove 36 and the third forwarding groove 74 serve to move the third lens frame 62 back and forth along the optical axis when the cam barrel 24 rotates. As shown in FIG. 8, the third cam groove 36 guides the third lens frame 62 from the retracted position to the imaging position in the section E of the third cam groove 36 and retains the third lens frame 62 at the extended position in the section F.

The relay lens 50 is followed by the focusing lens group 52, which is held by the fourth lens frame 76. As shown in FIG. 7, the fourth lens frame 76 is integrally provided with two guide blocks 78, 80 on its outer periphery. The two guide blocks 78, 80 have cylindrical and U-letter shapes, respectively. The cylindrical guide block 78 is fitted on a third guide bar 82 provided in the fixed barrel 20. The U-letter shaped guide block 80 is fitted on the second guide bar 72 provided in the fixed barrel 20.

The second guide bar 72 on which the U-letter shaped guide block 80 is fitted also guides the third lens frame 62. Thus, the third and fourth lens frames 62 and 76 share a guide bar. Sharing a guide bar leaves more usable space in the fixed barrel 20 where motors and other devices can be placed.

The third guide bar 82 on which the cylindrical guide block 78 is fitted is used only by the guide block 78. The third guide bar 82 is arranged so as to be parallel to the longitudinal axis of the fixed barrel 20 with the base end being fixed to the inner surface of the base 26 and the front end being supported by the front supporting mechanism 104 that supports the first and second guide bars 70 and 72.

As described above, the guide blocks 78 and 80 are slidably fitted on the third and second guide bars 82 and 72, respectively. In this way, the fourth lens frame 76 is supported so that it is movable along the optical axis within the fixed barrel 20. The lens apparatus 2 moves the fourth lens frame 76 along the optical axis for focusing.

The fourth lens frame 76 is driven by a focusing lens driving unit 84 as follows. A lead screw 86 is provided along the optical axis in the fixed barrel 20 as shown in FIGS. 4 to 7. The lead screw 86 is rotatably supported at both ends by a bracket 88 that is fixed to the inner surface of the base 26. A guide rod 90 is provided near and parallel to the lead screw 86. Both ends of the lead screw 86 are fixed to the bracket 88. A slide piece 92 is slidably supported by the guide rod 90. The slide piece 92 has a nut 94 that is screwed on the lead screw 86. Thus, the slide piece 92 moves back and forth according to the rotation of the lead screw 86 when the lead screw 86 rotates.

A follower gear 96 is fixed to the lead screw 86 at the front end of the lead screw 86. The follower gear 96 is engaged with a driving gear 98 that is fixed to the output shaft of a focusing lens driving motor 100. The focusing lens driving motor 100 is fixed to the bracket 88. The focusing lens driving motor 100 operates to rotate the driving gear 98. The rotation of the driving gear 98 is transmitted to rotate the lead screw 86. Rotation of the lead screw 86 causes the slide piece 92 to move along the guide rod 90.

The fourth lens frame 76 is connected to the slide piece 92 via a spring 102. Moving the slide piece 92 causes the fourth lens frame 76 to move. Moving the slide piece 92 backward triggers the spring 102 to pull and move the fourth lens frame 76 backward. In contrast, moving the slide piece 92 forward triggers the slide piece 92 to push and move the fourth lens frame 76 forward. The fourth lens frame 76 is pushed by the slide piece 92 through a projection 76a that protrudes from the rear end of the fourth lens frame 76 and abuts the slide piece 92. In this way, the fourth lens frame 76 moves back and forth along the optical axis when the focusing lens driving motor 100 is driven to move the slide piece 92 back and forth. The spring 102 connects the fourth lens frame 76 to the slide piece 92 so that the fourth lens frame 76 moves without backlash between the nut 94 and the lead screw 86. This ensures accurate movements of the fourth lens frame 76. A focusing lens driving unit 84 receives power and control signals via a focusing lens driving unit flexible board 103.

The camera lens 14, as described above, includes four lens groups: a fixed lens group 46, a zoom lens group 48, a relay lens group 50, and a focusing lens group 52. Among them, the fixed and zoom lens groups 46 and 48 are supported in three-way suspensions by pins, as well as the relay lens group 50 and the focusing lens group 52, are supported by guide bars. As described above, the relay and focusing lens groups 50 and 52 are supported by the first, second, and third guide bars 70, 72, and 82. The guide bars are supported by the front supporting mechanism 104 at their front ends. The front supporting mechanism 104 will now be described.

As shown in FIGS. 2 to 5, the front supporting mechanism 104 includes primarily a middle frame 106 and a stopper ring 108. The middle frame 106 has a cylindrical body that is slidably fitted in the inner periphery of the movable barrel 22. The middle frame 106 has three supporting parts 110 on the inner periphery of the middle frame 106 at the positions of the guide bars for supporting the front ends of the guide bars. Each supporting part 110 includes a bore 110a that extends parallel to the optical axis and has nearly the same diameter as the corresponding guide bar. Each guide bar is fitted into a bore 110a to obtain support at its front end.

The stopper ring 108 has a ring shape and is fixed to the inner periphery of the base end of the movable barrel 22. The middle frame 106 is supported so that it is slidable in the movable barrel 22 except for backward movement being restricted by the stopper ring 108. A pair of spring hooks 108a protrude on the inner periphery of the stopper ring 108. A pair of spring hooks 106a protrude on the inner periphery of the middle frame 106. Each spring 112 is hooked between a spring hook 106a and a spring hook 108a. This gives backward bias to the middle frame 106 as it slides in the movable barrel 22.

The front supporting mechanism 104, as described above, operates as described below.

The middle frame 106 is situated at the base end of the movable barrel 22 in an extended state of the lens apparatus 2, as shown FIGS. 3 and 4. This is because the spring 112 biases the middle frame 106 backward. In this state, the guide bars are supported by the front supporting part 110 with their front ends fitted in the bores 110a.

When the movable barrel 22 is retracted, the middle frame 106 is pulled and moves backward. However, as shown in FIG. 2, with the front supporting part 110 contacting the guide block 64, the middle frame 106 withdraws against the bias force of the spring 112 because it is slidable in the movable barrel 22. This avoids the problem that the movable barrel 22 cannot be further retracted because the middle frame 106 contacts guide block 64. With the base ends of the guide bars fixed and the front ends supported by the front supporting mechanism 104, the guide bars are able to guide the lens frame without vibrations and other problems of moving the lens frames.

An additional pair of spring hooks (not shown in the drawings), other than spring hooks 106a, are provided on the inner periphery of the middle frame 106. These two spring hooks are used with the two hook springs 113 shown in FIG. 5. The other ends of the two hook springs 113 are hooked by spring hooks formed on the second lens frame 56 that are the spring hooks not shown in the drawings. In this way, the hook springs 113 continuously bias the middle frame 106 and the second lens frame 56 toward each other. This eliminates looseness that may occur while the movable barrel 22 and the second lens frame 56 move.

Both the movable barrel 22 and the second lens frame 56 are supported by the cam pins in the three-way suspensions. There is a gap between the cam pins and the cam grooves in which the cam pins fit. This causes looseness during movements of the lens frames, particularly when the rotational directions of the lens frames driving structures are reversed. Biasing the middle frame 106 and the second lens frame 56 toward each other causes the cam pin to constantly press the inner wall of the cam groove. This eliminates looseness during these movements and securely guides the lens frames.

The structure of the diaphragm shutter unit 16 is described below. The diaphragm shutter unit 16 is positioned between the zoom lens group 48 and the relay lens group 50 and is fixed to the third lens frame 62 as shown in FIGS. 2 to 4. The diaphragm shutter unit 16 is provided with a diaphragm and a shutter, which are not shown in the drawings. The diaphragm is driven by a diaphragm motor 114 (see FIG. 6) to adjust the aperture. The shutter is driven by a shutter motor 116 (see FIG. 6) that opens and closes the shutter.

Both the diaphragm motor 114 and shutter motor 116 are provided in the diaphragm shutter unit 16 and operate based on driving signals from the control unit in the camera body. They are driven based on driving signals from the control unit in the camera body to set the diaphragm and shutter for certain diaphragm stop settings and shutter speeds. The diaphragm shutter unit 16 receives power and driving signals via a diaphragm shutter unit flexible printed circuit board 122 as shown in FIG. 5.

As shown in FIG. 7, a through-channel 118 is formed on the outer periphery of the third lens frame into which the diaphragm shutter unit flexible printed circuit board 122 is inserted. Being inserted in the through-channel 118, the diaphragm shutter unit flexible printed circuit board 122 cannot become dislocated in the fixed barrel 20.

The structure of the CCD unit 18 will now be described. The CCD unit 18 is behind, that is, on the image side, of the focusing lens group 52 and fits in an opening 120 formed in the center of the base 26 that is centered on the optical axis of the lens apparatus 2, as shown in FIGS. 2 to 4. Light that has entered the camera lens 14 is converted to image signals by the CCD unit 18 and is output to the camera body via a main printed circuit board 124 (see FIG. 5).

The lens apparatus 2 having the structure described above is mounted in the camera body with the base 26 fixed to the camera body. The lens apparatus 2 is mounted with most or all of the lens apparatus 2 being inside the camera body when the lens apparatus 2 is in the retracted position. The driving mechanisms, including motors, are driven based on driving signals from the control part in the camera body to move the lens apparatus to an extended state.

The lens apparatus 2 of this embodiment, which has the structure described above, operates as described below. As shown in FIG. 2, the movable barrel 22 is housed in the fixed barrel 20 when the lens apparatus 2 is not in use. This is the retracted state. When the camera body is set for the stand-by state from the retracted state, the cam barrel driving motor 38 (see FIG. 7) is driven to rotate the cam barrel 24 at a certain rate. This results in extending the movable barrel 22 from the fixed barrel 20 to the extended position shown in FIG. 3. With the movable barrel 22 being extended, the second and third lens frames 56 and 62 move forward by a certain distance and stop. Consequently, the zoom lens group 48 reaches the wide-angle end and the relay lens group 50 reaches the imaging position.

The focusing lens driving motor 100 drives the fourth lens frame 76 forward by a certain distance while the cam barrel driving motor 38 is driven. This positions the focusing lens group 52 at a stand-by focus position. The lens apparatus 2 is now in the stand-by state in which the camera lens 14 is at the wide-angle end. Here, the following detection mechanism is used to detect that the zoom lens group 48 is at the wide-angle end.

As shown in FIG. 5, a photodetector 128 is provided inside the base 26 via a mounting plate 126. A reflecting plate 130 is provided on the inner periphery of the cam barrel 24 at a certain position. An opening 132 is formed on the outer periphery of the fixed barrel 20 at the position corresponding to the photodetector 128. The photodetector 128 is turned on when the reflecting plate 130 is aligned with the opening 132. The reflecting plate 130 is positioned so that it is aligned with the opening 132 when the zoom lens group 48 reaches the wide-angle end. Thus the photodetector 128 detects when the zoom lens group 48 is at the wide-angle end.

A detection mechanism detects when the focusing lens group 52 is at the stand-by focus position as described below. A photo-interrupter 136 is provided inside the base 26 via a mounting plate 134 as shown in FIG. 5. A target member (not shown in the drawings) is provided on the fourth lens frame 76. The photo-interrupter 136 is turned on when the target member is aligned with it. The photo-interrupter 136 and the target member are arranged so that the target member is aligned with the photo-interrupter 136 when the focusing lens group 52 has reached the focus position. Thus, the status that the focusing lens group 52 is at the stand-by focus position is detected. The photo-interrupters 45 and 136 and the photodetector 128 operate with power and pulse signals that are transmitted or received via a flexible printed circuit board 138.

In this way, the lens apparatus obtains the stand-by state. With the lens apparatus 2 in the stand-by state, a zoom switch (not shown in the drawings) provided on the camera body can be switched to the telephoto setting so that the zoom lens group 48 moves in a zooming mode toward the telephoto end. When the zoom switch is switched to the telephoto setting, the cam barrel driving motor 38 (see FIG. 7) drives the cam barrel 24 in the direction that causes the zoom lens group 48 to move forward in the extended direction toward the object side. As a result, the zoom lens group 48 moves toward the telephoto end in the zoom mode. FIG. 4 shows the camera lens 14 at the telephoto end of the zoom range. During zooming, the zoom lens group 48 moves between the wide-angle end shown in FIG. 3 and the telephoto end shown in FIG. 4 while the fixed lens group 46 and the relay lens group 50 remain at fixed positions.

A new position of the zoom lens group 48 can be detected using the amount of rotation of the cam barrel 24. The zoom lens group 48 moves in proportion to the amount of rotation of the cam barrel 24. The amount of rotation of the cam barrel 24 after the zoom lens group 48 reaches the wide-angle end can be used to determine the position along the optical axis of the zoom lens group 48. The zoom ratio can be obtained based on the position of the zoom lens group 48.

The zoom ratio corresponding to the rotated position of the cam barrel 24 is calculated based on the number of pulses from the photo-interrupter 45 in accordance with the amount of rotation of the cam barrel 24 caused by the cam barrel driving motor 38, as described above. In this way, the camera lens 14 is set for a desired zoom ratio and is ready for recording an image.

In this state, the user pushes the shutter button on the camera body so that focusing is conducted based on the information of the distance of the object being imaged. The focusing lens driving motor 100 is driven to move the focusing lens group 52 to an in-focus position from the stand-by focus position. Then, the diaphragm motor 114 (see FIG. 6) and shutter motor 116 are driven based on the exposure information of the object so that a picture is taken with a certain diaphragm stop and a certain shutter speed. After recording an image, the focusing lens driving motor 100 is driven again to return the focusing lens group 52 to the stand-by focus position.

After recording of an image is completed, the camera is turned off, and the movable barrel 22 group is retracted. In this process of retraction, the movable barrel 22 and the lens groups are retracted as follows. First, the focusing lens driving motor 100 is driven to move the fourth lens frame 76 backward toward the image position (to the right as shown in FIGS. 2–4). When the focusing lens group 52 reaches a predetermined position, the cam barrel driving motor 38 is driven to move the movable barrel 22, the second lens frame 56, and the third lens frame 62 backward (to the right as shown in FIGS. 2–4). In this way, the movable barrel 22 is retracted and both the moveable barrel 22 and the fixed barrel 20 are housed, as shown in FIG. 2.

As described above, the focusing lens group 52 is first retracted to a predetermined position and, then, the other lens groups are retracted. This is to prevent the relay lens group 50 from contacting the focusing lens group 52, which may occur if all the lens groups were retracted simultaneously. The cam barrel driving motor 38 is designed to operate after the focusing lens group 52 is retracted to a position out of contact with the relay lens group 50.

With the lens apparatus 2 of the embodiment described above, the movable barrel 22 is extended from the fixed barrel 20 only for recording an image. The lens apparatus 2 of this embodiment moves the lens groups to respective predetermined positions to take pictures. When the lens groups move, two lens groups, the fixed and zoom lens groups 46 and 48, move with support from the three-way suspensions and the other lens groups, the relay and focusing lens groups 50 and 52, move with support from the guide bars in the lens apparatus 2, which require less space for movement compared to the three-way suspensions. Reducing the space required for lens frame movements in the lens barrel 12 allows other devices, such as the driving motors, to be housed in the lens barrel while reducing the overall size of the lens apparatus.

Having lens frames share a guide bar, as in this embodiment, also leaves more usable space in the lens barrel 12. Still, all the guide bars are securely supported at the both ends while they guide the lens groups.

The invention being thus described, it will be obvious that the same may be varied in many ways. For example, in the lens apparatus in which multiple lens groups move, only one lens group can be supported in a three-way suspension and the others can be supported by the guide bars that require less space for movement compared to the three-way suspension. This may further assist in obtaining high zoom ratios and reducing the space required for lens frame movement in the lens barrel 12. Additionally, although in the preferred embodiment described above, the first and second lens groups of the four-group zoom lens are supported in three-way suspensions, the lens groups that are supported in the three-way suspension are not confined to the first and second lens groups. For example, the first and third lens groups can be supported in three-way suspensions. Selection between the three-way suspension and the guide bars may be made depending on the diameter of the lens groups. For example, two lens groups with larger diameters may be supported in three-way suspensions and the other lens groups may be supported by the guide bars. This ensures secure operations of the lens groups. Furthermore, although in the preferred embodiment described above, a four-group zoom lens is used, the present invention is applicable to lens apparatuses that includes fewer or more lens groups. Also, although the preferred embodiment relates to an electronic still camera, the present invention can relate to various cameras, including cameras using photographic film, and to similar imaging systems in general. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A lens apparatus comprising:
    a first barrel that defines an optical axis;
    a first lens group movable along said optical axis;
    a second lens group movable along said optical axis;
    a first frame that holds said first lens group;
    a second frame that holds said second lens group;
    three first grooves unequally spaced in the circumferential direction in said first barrel for guiding the movement of said first frame along said optical axis; and
    a second groove in said first barrel between the two of said three first grooves that are spaced the farthest apart in the circumferential direction in said first barrel for guiding the movement of said second frame along said optical axis.

2. The lens apparatus of claim 1, wherein said three first grooves and said second groove are forwarding grooves parallel to said optical axis.

3. The lens apparatus of claim 2, wherein said three first forwarding grooves and said second forwarding groove extend through said first barrel.

4. The lens apparatus of claim 2, further comprising:
    a second barrel that at least partially overlaps said first barrel along said optical axis;
    three third grooves unequally spaced in the circumferential direction in said second barrel for guiding the movement of said first frame along said optical axis; and
    a fourth groove in said second barrel between the two of said three third grooves that are spaced the farthest apart in the circumferential direction in said second barrel for guiding the movement of said second frame along said optical axis.

5. The lens apparatus of claim 4, wherein said three third grooves are cam grooves for driving said first frame along said optical axis based on rotation of said second barrel and said fourth groove is a cam groove for driving said second frame along said optical axis based on rotation of said second barrel.

6. The lens apparatus of claim 3, further comprising:
a second barrel that at least partially overlaps said first barrel along said optical axis;
three third grooves unequally spaced in the circumferential direction in said second barrel for guiding the movement of said first frame along said optical axis; and
a fourth groove in said second barrel between the two of said three third grooves that are spaced the farthest apart in the circumferential direction in said second barrel for guiding the movement of said second frame along said optical axis.

7. The lens apparatus of claim 6, wherein said three third grooves are cam grooves for driving said first frame along said optical axis based on rotation of said second barrel and said fourth groove is a cam groove for driving said second frame along said optical axis based on rotation of said second barrel.

8. The lens apparatus of claim 1, wherein said three first grooves are cam grooves for driving said first frame along said optical axis based on rotation of said first barrel and said second groove is a cam groove for driving said second frame along said optical axis based on rotation of said first barrel.

9. The lens apparatus of claim 1, further comprising three pins on the periphery of said first frame that engage said three first grooves.

10. The lens apparatus of claim 1, further comprising:
a second barrel that at least partially overlaps said first barrel along said optical axis; and
three pins on the exterior of said second barrel that engage said three first grooves.

11. The lens apparatus of claim 2, further comprising:
a second barrel that at least partially overlaps said first barrel along said optical axis; and
three pins on the exterior of said second barrel that engage said three first grooves.

12. The lens apparatus of claim 4, further comprising:
a third barrel that at least partially overlaps said first barrel along said optical axis; and
three pins on the exterior of said third barrel that engage said three third grooves.

13. A lens apparatus comprising:
a fixed barrel that defines an optical axis;
three first forwarding grooves in the fixed barrel that extend parallel to said optical axis and that are unequally spaced in the circumferential direction;
a second forwarding groove in the fixed barrel that extends parallel to said optical axis between the two of the three first forwarding grooves that are spaced the farthest apart in the circumferential direction on the inner periphery of the fixed barrel;
a first lens group;
a first frame that holds said first lens group;
three pins that extend outside the portion of said first frame that holds said first lens group and that engage said three first forwarding grooves;
two guide bars fixed in parallel to said optical axis;
a second lens group;
a second frame that holds said second lens group;
two guide members on the outer periphery of said second frame that engage said two guide bars; and
a pin on the outer periphery of said second frame that engages said second forwarding groove.

14. The lens apparatus of claim 13, further comprising:
a movable barrel that at least partially overlaps said fixed barrel for movement along said optical axis; and
wherein said three pins are mounted on the exterior surface of said movable barrel.

15. The lens apparatus of claim 13, wherein said three pins are mounted on the outer periphery of said first frame.

16. The lens apparatus of claim 13, further comprising:
a cam barrel that at least partially overlaps said fixed barrel along said optical axis and that is rotatable about said optical axis; and
three cam grooves in said cam barrel that are unequally spaced in the circumferential direction and that engage said three pins in order to drive said first frame along said optical axis.

17. The lens apparatus of claim 14, further comprising:
a cam barrel that at least partially overlaps said fixed barrel along said optical axis and that is rotatable about said optical axis; and
three cam grooves in said cam barrel that are unequally spaced in the circumferential direction and that engage said three pins in order to drive said first frame along said optical axis.

18. The lens apparatus of claim 15, further comprising:
a cam barrel that at least partially overlaps said fixed barrel along said optical axis and that is rotatable about said optical axis; and
three cam grooves in said cam barrel that are unequally spaced in the circumferential direction and that engage said three pins in order to drive said first frame along said optical axis.

* * * * *